Patented Oct. 22, 1935

2,018,116

UNITED STATES PATENT OFFICE 2,018,116

WELDING OR FUSING BAR

Walter S. Bingham, Cassopolis, Mich.

No Drawing. Application June 2, 1934,
Serial No. 728,702

12 Claims. (Cl. 219—8)

This application is a continuation in part of my application Serial No. 627,852, filed August 8, 1932, for alloy et cetera, since matured into Patent No. 1,988,108, Jan. 15, 1935.

The invention relates to an improved alloy composition of a fusing bar or welding rod for building wear resisting deposits in desired shapes such as points, surfaces, etc. being well adapted for acetylene or arc welding as well.

The objects of this invention are:

First, to provide an alloy welding bar or rod of improved composition and low cost adapted for use with an acetylene welding outfit for building up and forming wear resisting surfaces on structures such as plow points, digger points, snowplow shoes, railroad track frogs and rail ends.

Second, to provide such a bar or rod of a composition that when used for applying wear resisting surfaces or points to tools of substantially larger mass than the wear resisting surfaces or points will produce a hard non-brittle deposit.

Third, to provide such a bar or rod of a composition such that when a wear resisting surface or point is applied to a tool or the like of substantially larger mass than the wear resisting surface or point, a hard non-brittle deposit high in cementite is formed.

Fourth, to provide such a bar or rod of improved composition and low cost the use of which will give a hard non-brittle deposit without resorting to the use of expensive alloying elements.

Other objects and advantages pertaining to details and economies of my invention will appear from the description to follow.

An example of the way in which I carry out my invention is as follows: I prepare an alloy by using half and half of pig iron and scrap steel, such as railroad rails. This is melted together in a foundry cupola at a temperature of about 3200 to 3800 degrees Fahrenheit. When the metal is thoroughly fused and ready to pour, one third of one per cent. (0.33%) by weight of powdered metallic manganese or its equivalent of ferromanganese, is delivered with the molten metal into the cupola for pouring. The amount added varies with the manganese content of the scrap and is regulated to give the desired manganese content as set forth herein. The metal is then poured into molds.

At first I found that it was inexpedient to pour rods in molds having a diameter of less than ⅝ of an inch but I have since made and used rods $\frac{5}{16}$ of an inch in diameter and have obtained very satisfactory results. Rods of these sizes lend themselves exceedingly well to the use of the acetylene torch, as it is the purpose to apply the same in very considerable quantity to properly build up the work in hand, so that this comparatively large size rod is desirable for the work in hand, such as plow points, cultivator shovels, spring tooth harrow teeth, and the like.

The resulting product shows a mass of metal containing from .33% to 0.5% manganese, 0.5% silicon, from 3.255% to 4% carbon, 0.2% phosphorus, and 0.1% sulphur. The same when cast as ready for use appears as a roughened rod of about ⅝ of an inch in diameter, and surfaces of fractured pieces appear as those of white cast iron. Microphotographs of its structure show a predominance of cementite.

The composition stated above makes a very satisfactory welding rod, but the materials can vary in proportion and still produce a highly satisfactory bar or rod. For instance, the carbon can be varied from 2.3% to 4% giving highly satisfactory results and it can be in ranges inclusive of those in hypo-eutectic and eutectic cast iron. It will be understood by those skilled in the art that the effective carbon can be varied in other ways without departing from my invention.

The manganese can be reduced to .33% and must be in quantities in excess of that necessary to combine with any sulphur present in the alloy. I have had best results with silicon in the neighborhood of .5% although the silicon content can vary from a trace to .9% and still give very satisfactory results.

In compositions with phosphorus varying from a trace to .35% I have had very satisfactory results. Sulphur varying from a trace to .2% likewise gives satisfactory results. It will be understood by those skilled in the art that the effect of the various elements can be somewhat varied by interference created by the addition of other elements and I do not wish to be limited to the specific combinations indicated.

The rod is used for arc or acetylene welding and deposits made by such welds have a high degree of hardness and a toughness and lack of brittleness that makes such deposits of great value as wear surfaces and digging points or the like. The deposit has substantially the cementite structure of hypo-eutectic white cast iron but is much less brittle than such cast iron. The deposit is of a hardness that cannot be cut with an ordinary metal hacksaw and cannot be shattered by blows of a hammer, whereas ordinary white cast iron can be thus shattered.

In employing the welding rod for producing wear surfaces or digging points, the weld deposit is made on the body portion of the tool or surface. The tool or surface, which will be referred to as the parent metal, may be of steel or iron which is, in substantially every instance, of less hardness than the wear point. The parent metal is not as hard as the wear surface and is of greater toughness or has properties lending to ease of manufacture, or to resistance to stresses to which the tool is subjected when in use. In most instances the parent metal is of a mass considerably greater than the wear surface or point and I have found that in using a rod made according to my invention a weld deposit made on such parent metal has the desired hardness which may be in the neighborhood of 500 on the Brinell scale or of the hardness of white cast iron. The material itself is of less brittleness than is what is ordinarily known as white cast iron and, when it is combined with the parent metal, will not only resist abrasive wear, but will also resist shattering blows that would ordinarily crush or shatter ordinary white cast iron. I believe that the structure is somewhat comparable with chilled surfaces produced on castings and that the deposition on the larger mass of parent metal may have an effect in favoring the formation of cementite so that the cementite structure is comparable with that of hypo-eutectic white cast iron.

Having thus described my invention, what I claim as new and desire to secure by Letters Patent is:

1. A fusing bar or welding rod comprising an alloy of iron containing carbon 2.3 to 4 per cent., manganese not less than .33 per cent., silicon a trace to .9 per cent., phosphorus a trace to .35 per cent., and sulphur a trace to .2 per cent.

2. A fusing bar or welding rod comprising an alloy of iron containing carbon 2.3 to 4 per cent., manganese not less than .33 per cent., silicon a trace to .9 per cent., and sulphur a trace to .2 per cent.

3. A fusing bar or welding rod comprising an alloy of iron containing carbon 2.3 to 4 per cent., manganese not less than .33 per cent., silicon a trace to .9 per cent., and phosphorus a trace to .35 per cent.

4. A fusing bar or welding rod comprising an alloy of iron containing carbon 2.3 to 4 per cent., manganese not less than .33 per cent., silicon a trace to .9 per cent.

5. A fusing bar or welding rod comprising an alloy of iron containing carbon 3.25 per cent., manganese .5 per cent., silicon .5 per cent., phosphorus .2 per cent., and sulphur .1 per cent.

6. A fusing bar or welding rod comprising an alloy of iron containing carbon 3.25 per cent., manganese .5 per cent., silicon .5 per cent., and sulphur .1 per cent.

7. A fusing bar or welding rod comprising an alloy of iron containing carbon 3.25 per cent., manganese .5 per cent., silicon .5 per cent., and phosphorus .2 per cent.

8. A fusing bar or welding rod comprising an alloy of iron containing carbon 3.25 per cent., manganese .5 per cent., and silicon .5 per cent.

9. A fusing bar or welding rod comprising an alloy of iron containing carbon, manganese, silicon, phosphorus and sulphur in such proportions that a weld deposit made therewith on a larger mass of parent metal and air cooled from the molten state has the cementite structure of hypo-eutectic white cast iron and a brittleness less than that of such white cast iron.

10. A fusing bar or welding rod comprising an alloy of iron containing carbon, manganese, silicon, phosphorus and sulphur in such proportions that a weld deposit made therewith has the cementite structure of hypo-eutectic white cast iron and a brittleness less than that of such white cast iron.

11. In a welding rod or fusing bar, an iron alloy having a carbon content substantially the same as that of hypo-eutectic cast iron and comprising manganese, silicon, sulphur and phosphorus in such proportions that deposits made therefrom have a cementite structure substantially the same as the eutectoid and pro-eutectoid cementite structure of white cast iron in which the cementite remains substantially unchanged to graphite during solidification and air cooling from the molten state but in proportions such that the weld deposits have a brittleness less than that of white cast iron.

12. In a welding rod or fusing bar, an iron alloy having substantially the carbon content and structure of hypo-eutectic white cast iron and containing silicon, manganese and phosphorus in proportions conducive to the formation of cementite and not conducive to the formation of graphite when the molten metal is solidified and air cooled but in proportions such that the weld deposits have a brittleness less than that of white cast iron.

WALTER S. BINGHAM.